United States Patent [19]

Murayama

[11] Patent Number: 5,488,483
[45] Date of Patent: Jan. 30, 1996

US005488483A

[54] FACSIMILE WITH USER SELECTIVE COMPRESSION METHODS

[75] Inventor: Masahiro Murayama, Kawasaki, Japan

[73] Assignee: Canon Kabushiki Kaisha, Tokyo, Japan

[21] Appl. No.: 313,396

[22] Filed: Sep. 27, 1994

Related U.S. Application Data

[63] Continuation of Ser. No. 93,630, Jul. 20, 1993.

[30] Foreign Application Priority Data

Jul. 20, 1992 [JP] Japan ................................. 4-192116
Jul. 20, 1992 [JP] Japan ................................. 4-192117

[51] Int. Cl.$^6$ .............................. H04N 1/46; H04N 1/41; H04N 7/01
[52] U.S. Cl. ..................... 358/426; 358/539; 358/500
[58] Field of Search ................................. 358/500, 501, 358/523, 539, 400, 401, 451, 462, 426, 430, 261.2

[56] References Cited

U.S. PATENT DOCUMENTS

| | | | |
|---|---|---|---|
| 4,876,604 | 10/1989 | Nobuta | 358/400 |
| 4,937,681 | 6/1990 | Fujinawa et al. | 358/426 |
| 4,974,097 | 11/1990 | Kaneko et al. | 358/400 |
| 5,079,638 | 1/1992 | Kishi et al. | 358/462 |
| 5,216,518 | 6/1993 | Yamagami | 358/426 |

FOREIGN PATENT DOCUMENTS 4034540  5/1991  Germany.

OTHER PUBLICATIONS

Nov. 1989, pp. 564–568, XP91157, G. K. Wallace, "The ISO/OCTTT Standard for Continuous–Tone Image Compression." "State–of–the–Art Techniques Enrich Color Fax Resolution, Performance," Tasaki, Kenji, Ricoh Company, Ltd. pp. 32–33.

*Primary Examiner*—Edward L. Coles, Sr.
*Assistant Examiner*—Kimberly A. Williams
*Attorney, Agent, or Firm*—Fitzpatrick, Cella Harper & Scinto

[57] ABSTRACT

An apparatus having the G4 method and the JPEG method allows for the selection of standard resolution (200 dpi×200 dp) or precision resolution (400 dpi×400 dpi) by using a resolution selection key of operation unit 26 in order to improve the operativity and extend the breadth of selection of image quality. For each selection of standard resolution or precision resolution, the resolution and code information for designating quantization table for use with JPEG are stored in RAM 16, with its memory area being backed up by a battery.

32 Claims, 7 Drawing Sheets

FACSIMILE WITH USER SELECTIVE COMPRESSION METHODS

This application is a continuation of application Ser. No. 08/093,630 filed Jul. 20, 1993.

BACKGROUND OF THE INVENTION

1. Field of the Invention

The present invention relates to an image processing apparatus and an image communication apparatus, and more specifically to an image processing apparatus and an image communication apparatus having a plurality of compression methods in which image information is compressed by a designated compression method.

2. Related Background Art

The compression methods of image information include, in addition to an MMR method for use with G4 facsimile apparatus, a method defined by JPEG (hereinafter referred to as JPEG method), and this JPEG method has widely spread in recent years. The JPEG method involves converting color image information into information of frequency region, and quantizing and encoding the coefficients obtained by conversion. Both the JPEG method and the MMR method allow for the designation of resolution.

Since the total number of pixels generally decreases with lower resolution, the total number of compressed data also decreases, while at the same time image quality is degraded with lower density of pixels. Conversely, with higher resolution, the quantity of image data after compressed increases, with the image quality improved.

However, the JPEG method involves a quantization table, in addition to the resolution, as the factor for determining the image quality. The employment of quantization table stressing high frequency components allows for the reproduction of fine variations in image with enhanced ability of reproducing high frequency components, resulting in improved image quality. Of course, the number of coefficients of high frequency components increases, and proportionally, the total quantity of image data after compressed also increases. The use of quantization table with high frequency components stressed has the same effects as if data is compressed at high resolutions.

With the spread of JPEG method, a color facsimile apparatus has been devised in which transmission for color image information with the JPEG method is enabled by providing an encode/decode circuit of the JPEG method on the G4 facsimile apparatus. In one configuration, the apparatus allows for the selection of resolution with the MMR method by the use of a resolution selection key, but has a fixed quantization table with the JPEG method.

It should be noted that the resolution selection key is configured to be adapted to the MMR method, i.e., a transmission format of image data in G4 facsimile, but only allow for the selection from a plurality of fixed resolutions, such as 200 dpi×200 dpi, 300 dpi×300 dpi, and 400 dpi×400 dpi.

In the conventional configurations, no image quality adjusting ability by the selection of quantization table with the JPEG method has been utilized.

SUMMARY OF THE INVENTION

An object of the present invention is to provide an image processing apparatus in which at least one of the above-described problems has been solved.

Also, it is another object of the invention to provide an image processing apparatus with the improved operativity.

It is a further object of the invention to provide an image compressor with the improved operativity.

To accomplish such objects, according to one preferred embodiment of the present invention, there is disclosed an apparatus which allows for the selection of either a first encoding method corresponding to encoding of color image including a quantization process capable of changing a quantization table, or a second encoding method having an encoding characteristic different from that of the first encoding method, in which memory means is provided for storing a resolution in accordance with the selection by resolution selecting means for selecting the resolution of image information to be transmitted and quantization table information used in the quantization process of the first encoding method.

Also, it is a further object of the invention to improve the operativity of an image processing apparatus having a compression ability with the JPEG method and an image communication apparatus.

Also, it is a further object of the invention to provide an image communication apparatus which is easy to use.

Other objects and features of the present invention will be apparent from the ensuing description of embodiments and the accompanying drawings.

DETAILED DESCRIPTION OF THE PREFERRED EMBODIMENTS

The preferred embodiments of the invention will be now described with reference to the drawings.

Figure 1:
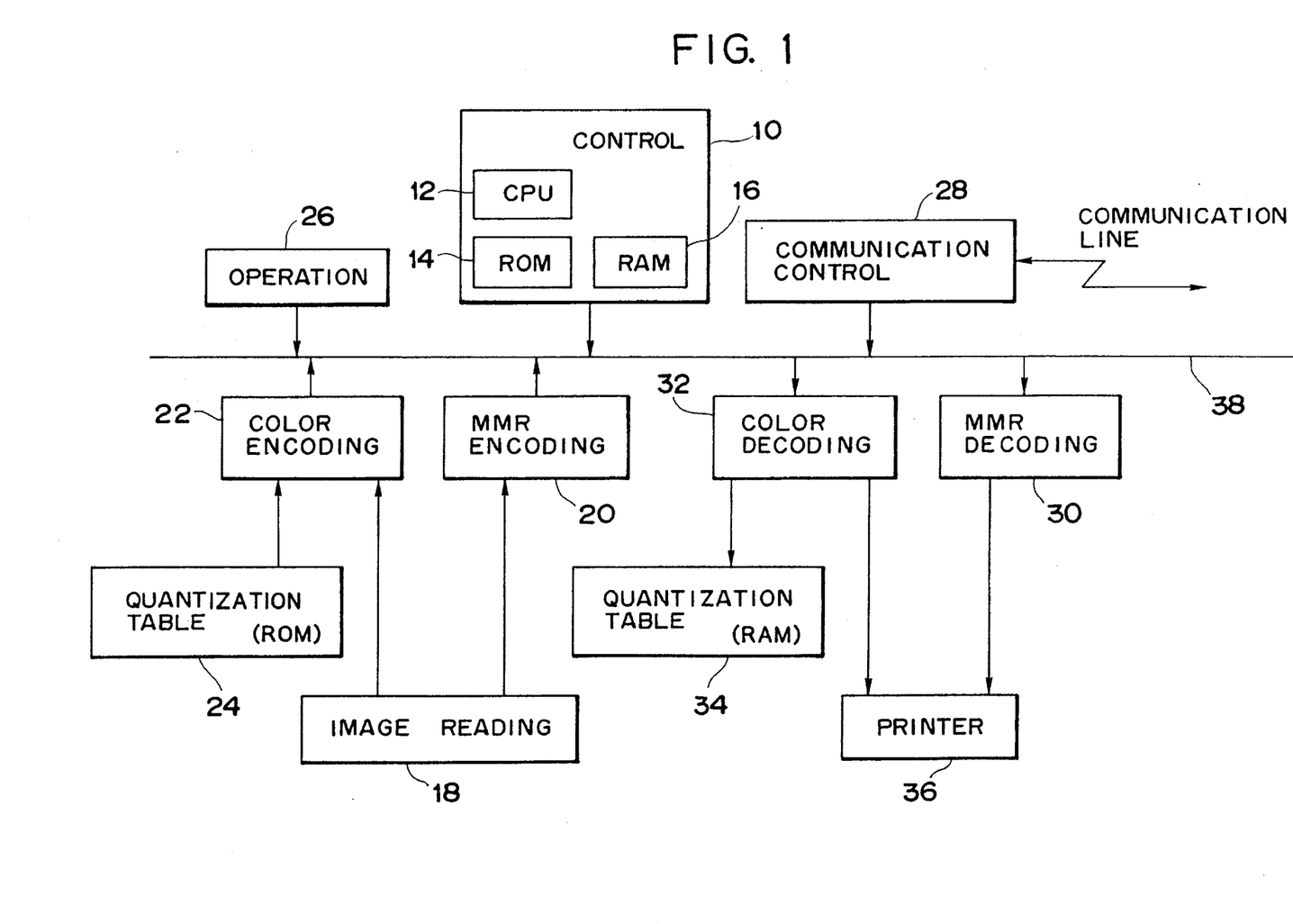
FIG. 1 is a schematic configurational block diagram of this embodiment.

FIG. 1 is a schematic configurational block diagram illustrating an embodiment of a color facsimile apparatus to which the present invention is applied. 10 is a control circuit for controlling the whole, comprised of a CPU 12, a ROM 14 for storing programs for the CPU 12 and other constants, and a RAM 16 for use as storage area of a variety of variables. A part of the RAM 16, which is always backed up by a battery, is used to store a resolution selection key management table as will be described later. Such resolution selection key management table may be stored in an EPROM.

18 is an image reader for reading a color original for the output of a color image signal composed of R, G, and B, for example. 20 is an MMR encoding circuit for encoding monochrome data converted from the color image signal read by the image reader 18, and 22 is a color encoding circuit for color encoding the image read by the image reader 18 with reference to a quantization table 24 stored in a memory (ROM) 24, by JPEG method, i.e., after converting the color image signal into signals of brightness Y and chrominance U, V. The structure of the quantization table stored in the memory 24 will be described later. The present invention is not limited to the JPEG method, but is also applicable to any of compression methods which reduce the redundancy by quantization.

26 is an operation unit on which the user can input various commands to the control circuit 10, and 28 is a communication control circuit, connecting to a communication line, for effecting calling connection and disconnection, and image transmission.

30 is an MMR decoding circuit for decoding MMR encoded image information as received, and 32 is a color decoding circuit for decoding JPEG encoded image information as received. With the JPEG method, the quantization table used for encoding is transmitted along with encoded image information, which is then decoded in the receiver side using the quantization table received. The quantization table received from the partner is stored in a memory (RAM) 34. 36 is a printer for printing an image decoded by the decoding circuits 30, 32, whether color print or monochrome print.

The control circuit 10, MMR encoding circuit 20, color encoding circuit 22, operation unit 26, communication control circuit 28, MMR decoding circuit 30 and color decoding circuit 32 are interconnected with each other via a bus 38 or connected to necessary partners.

Figure 2:
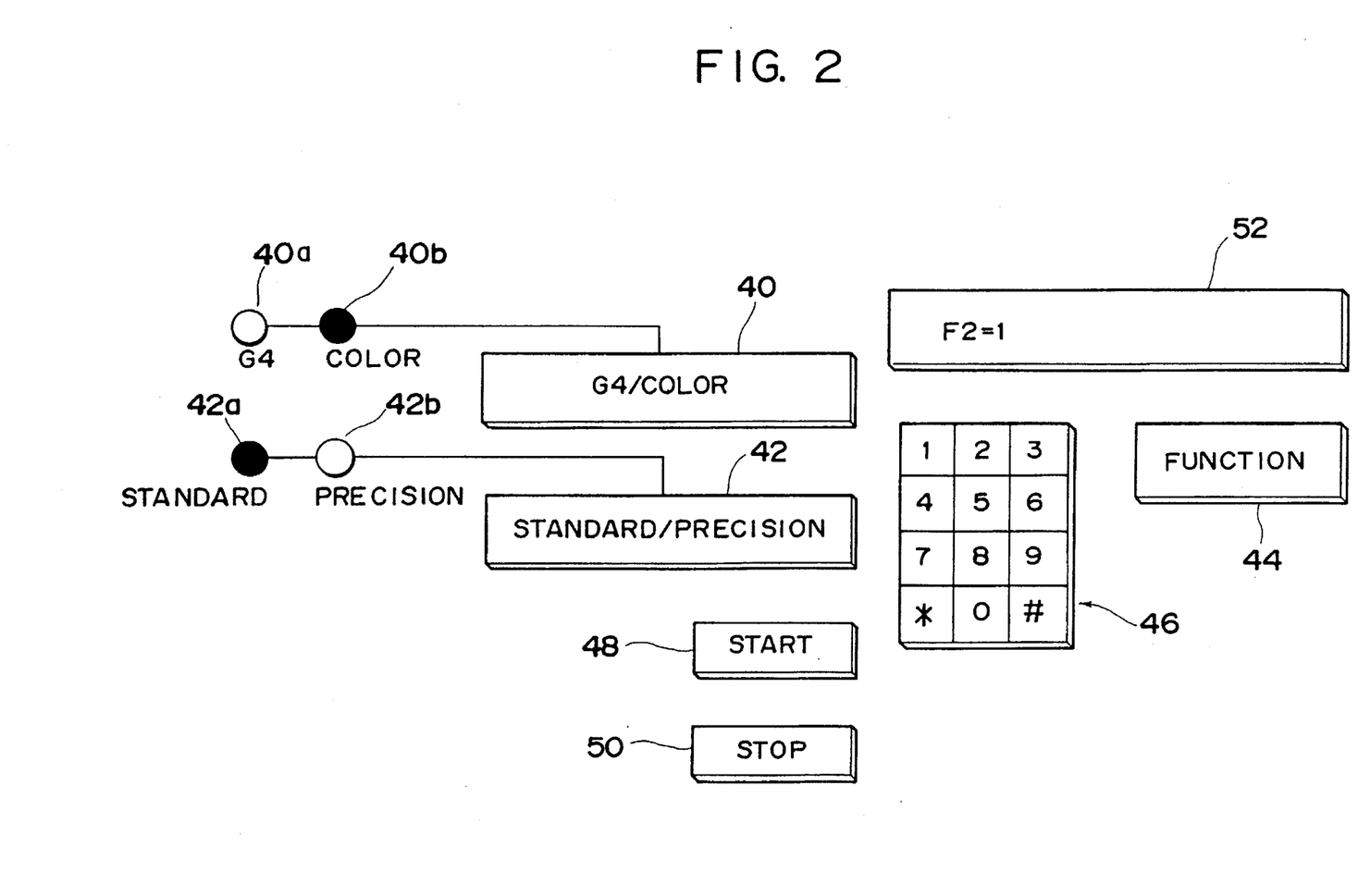
FIG. 2 is a view illustrating an operation panel face of an operation unit 26 in this embodiment.

FIG. 2 illustrates an example of an operation panel face for the operation unit 26. 40 is a G4/color selection key for selecting either G4 transmission or color transmission, wherein a light emitting diode (LED) 40a which lights on at the selection of G4 transmission and an LED 40b which lights on at the selection of color transmission are alternately turned on to select the transmission mode, every time such key is depressed. 42 is a resolution selection key for selecting either one of two resolutions, i.e., standard (200 dpi×200 dpi) and precision (400 dpi×400 dpi), this key being associated with an LED 42a which lights on at the selection of standard resolution and an LED 42b which lights on at the selection of precise resolution.

44 is a function key useful in registering a resolution selection key management table, and 46 is a ten key useful in making the dial input at the calling or registration of the resolution selection key management table. 48 is a start key for instructing the start of communication, 50 is a stop key for instructing the stop or interruption of communication, and 52 is a liquid crystal display for displaying input keys or various messages.

Figure 3:
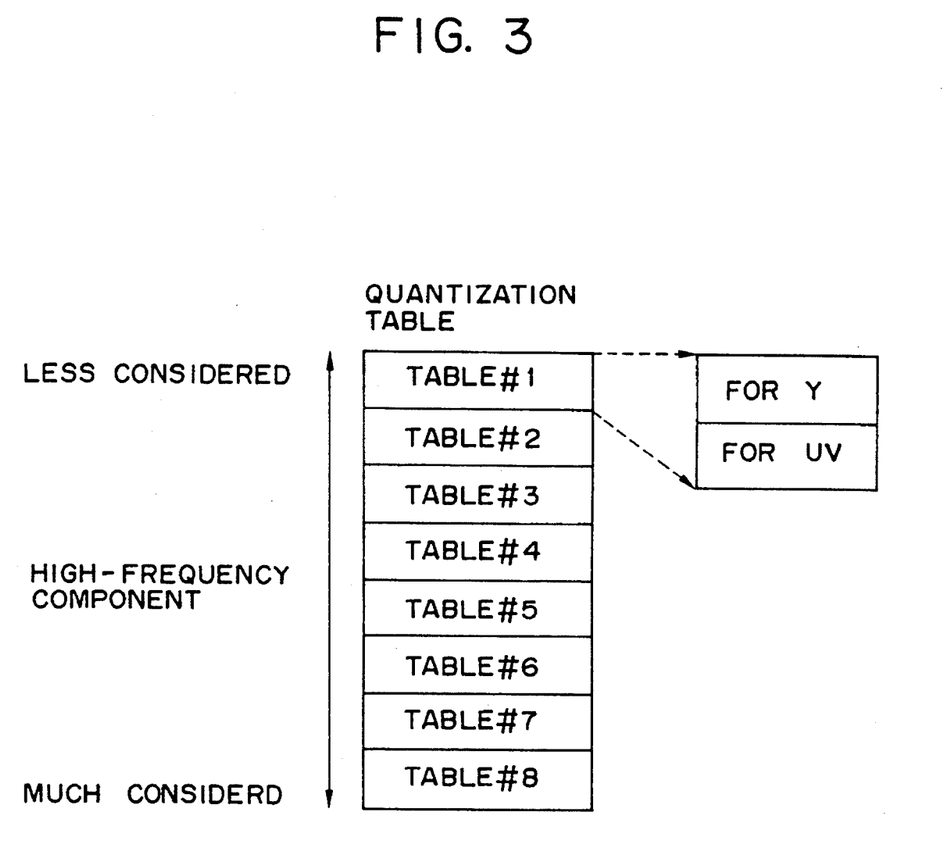
FIG. 3 is a structural diagram of a quantization table stored in a memory 24.

FIG. 3 illustrates the structure of a quantization table stored in the memory 24 as shown in FIG. 1. In this embodiment, quantization tables #1 to #8 consisting of eight levels with respect to high frequency components are stored in the memory 24. Table #1 has less considered high frequency components but the highest compression ratio, and table #8 has much considered high frequency components. Each table consists of a quantization table for Y (brightness) and a quantization table for U, V (chrominance) in color space.

Figure 4:
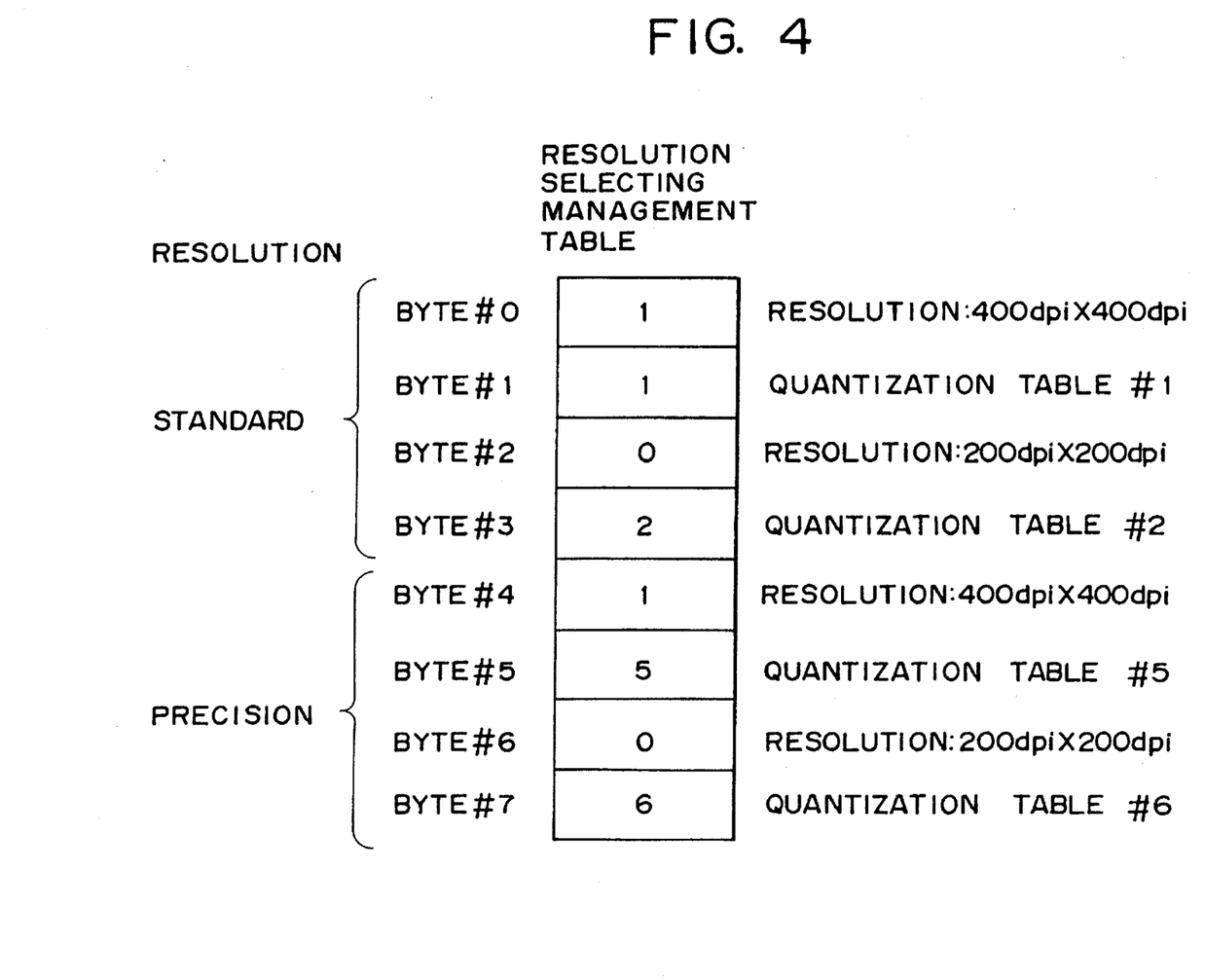
FIG. 4 is a structural diagram of a resolution selection key management table.

FIG. 4 illustrates the format of a resolution selection key management table stored in the memory 16. The resolution selection key management table has preregistered therein data indicating which of the quantization tables #1 to #8 as shown in FIG. 4 is to be employed as selected by the resolution selection key 42 and within the receiving capacity of the apparatus of destination.

The resolution selection key management table is comprised of eight bytes. Bytes #0, #2, #4, #6 register a code for designating the resolution (herein, "0" for 200 dpi×200 dpi and "1" for 400 dpi×400 dpi), and bytes #1, #3, #5, #7 register a code for designating the quantization table to be selected. Bytes #0 to #3 register a code for the selection of standard resolution with the resolution selection key 42, and bytes #4 to #7 register a code for the selection of precision resolution with the resolution selection key 42.

The way of using the resolution selection key management table will be described below. Byte #0 has a registration of a resolution first inquired of the receiver when the standard resolution is selected by the resolution selection key 42. The embodiment as shown in FIG. 4 is set to ask the receiver side to have 400 dpi×400 dpi (code "1") from the first time so as to make the most effective use of high resolution of G4 facsimile. Byte #1 has a registration of any of the tables #1 to #8 indicating the designation number of quantization table corresponding to the resolution set at byte #0 (FIG. 3). In an example of FIG. 4, information specifying a quantization table #1 of FIG. 3 is registered.

Byte #2 has a registration of a resolution (i.e., 200 dpi×200 dpi (code "0")) which can be always sent with G4 for the selection of standard resolution by the resolution selection key 42, and byte #3 has a registration of the designation number of quantization table corresponding to the resolution set at byte #2 (FIG. 3). Byte #3 of FIG. 4 has a registration of code "2" designating the quantization table #2 of FIG. 3.

Byte #4 has a registration of a resolution to be first inquired of the receiver when the precision resolution is selected by the resolution selection key 42. The embodiment as shown in FIG. 4 is set to ask the receiver side to have 400 dpi×400 dpi (code "1") from the first time so as to make the most effective use of high resolution of G4 facsimile. Byte #5 has a registration of the designation number of quantization table corresponding to the resolution set at byte #4 (FIG. 3). In the example of FIG. 4, the quantization table #5 of FIG. 3 is specified.

Byte #6 has a registration of a resolution (i.e., 200 dpi×200 dpi (code "0")) which can be always sent with G4 when the standard resolution is selected by the resolution selection key 42, and byte #7 has a registration of the designation number of quantization table corresponding to the resolution set at byte #6 (FIG. 3). In the example of FIG. 4, the quantization table #6 of FIG. 3 is specified.

Figure 5:
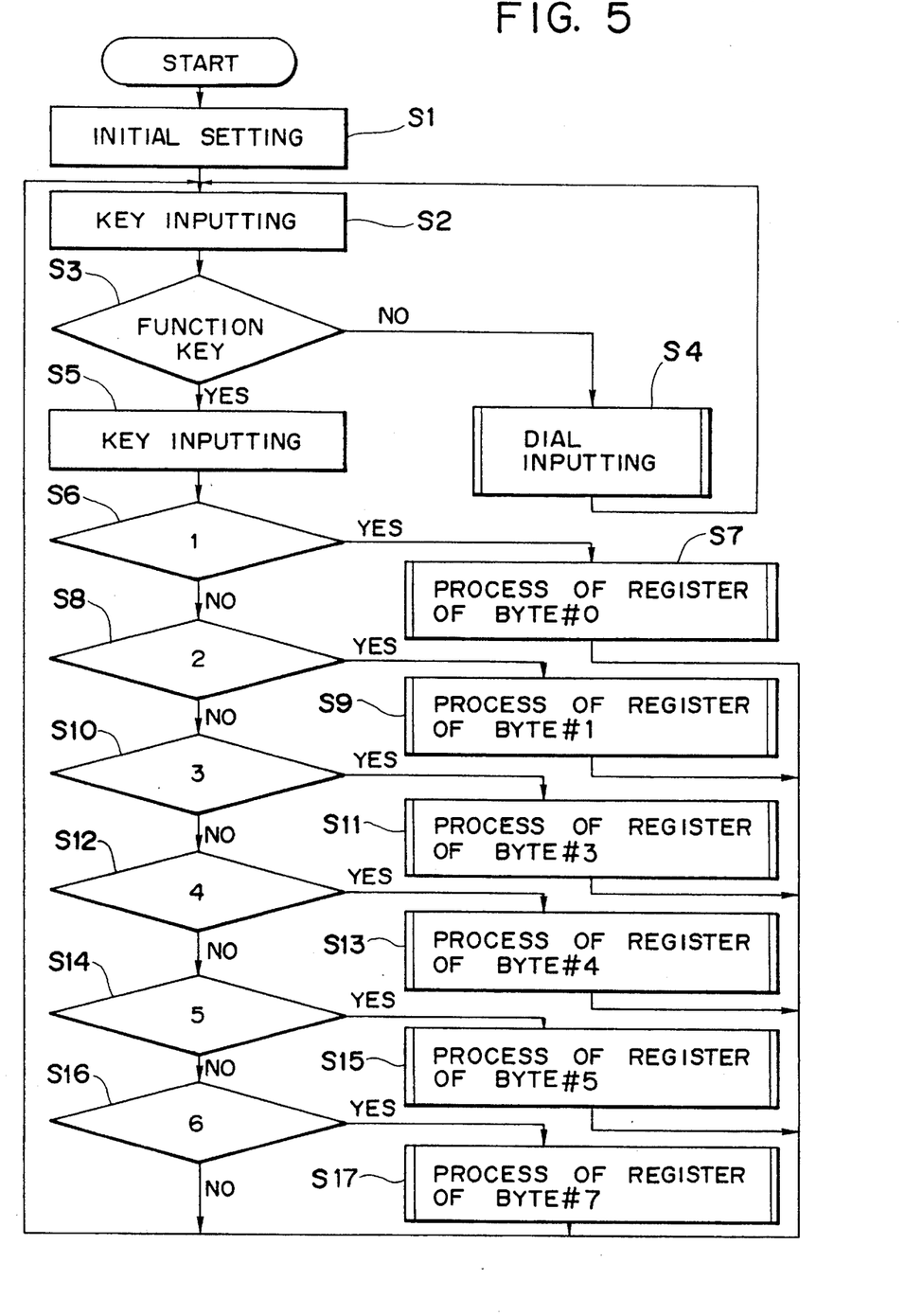
FIG. 5 is a flowchart of a register method for resolution selection key management table.

An exemplary procedure for registering desired codes to the bytes #0 to #7 of the resolution selection key management table as shown in FIG. 4 will be described below. FIG. 5 shows an operation flowchart for the control unit 10. A program shown by this operation flowchart is stored in the ROM 14.

If the procedure starts, first, a code "0" indicating 200 dpi×200 dpi is automatically registered in bytes #2, #6 of FIG. 4. Herein, it is necessary to set a resolution receivable by all the G4 facsimiles. Such an initial setting is shown at step S1 of FIG. 5.

The procedure waits for a key input (S2), and if it is not a function key 44 (S3), dial inputting is performed (S4). That is, the user inputs a telephone number by the use of ten key 46.

If the key input is determined to be a function key 44 (S3), "F_=" is displayed on a liquid crystal display 52, and the procedure waits for a key input (S5). Herein, if the input key is "1" (S6), a register process for "F1" or byte #0 is entered (S7). In the register process at S7, "F1=_" is displayed on the liquid crystal display 52, and the procedure waits for a key input, an input numeric value of one digit being displayed on the liquid crystal display 52 and registered in byte #0. After registration, the procedure returns to S2.

If the key input at S5 is equal to "2", "3", "4", "5" or 6 (S10, S12, S14, S16), register process for byte #1, #3, #4, #5 or #7 is entered (S9, S11, S13, S15, S17), and an input value is registered in byte #1, #3, #4, #5 or #7. Of course, if a numeric value out of the input range in input, an error is displayed, and the register is rejected. It should be noted that the contents of table of FIG. 3 and the correspondence relation between the numeric value input into bytes #0, #2, #4, #6 and the resolution are described in a user manual for the apparatus or on the apparatus itself.

In this way, necessary codes are registered in the resolution selection key management table as shown in FIG. 4. However, it is necessary to specify a resolution equal to or greater than that specified in byte #0 in at least byte #4 of the table of FIG. 4 to allow for the actual selection between standard resolution and precision resolution, and when the designated resolutions of both are equal, the quantization table designated in byte #5 must have more considered high frequency components than that designated in byte #1.

The same applies to bytes #2, #3 and bytes #6, #7, but since the resolutions designated in bytes #2, #6 are set to be equal by the initial setting (S1) of FIG. 5, the quantization table designated in byte #7 must have more considered high frequency components than that designated in byte #3.

Figure 6:
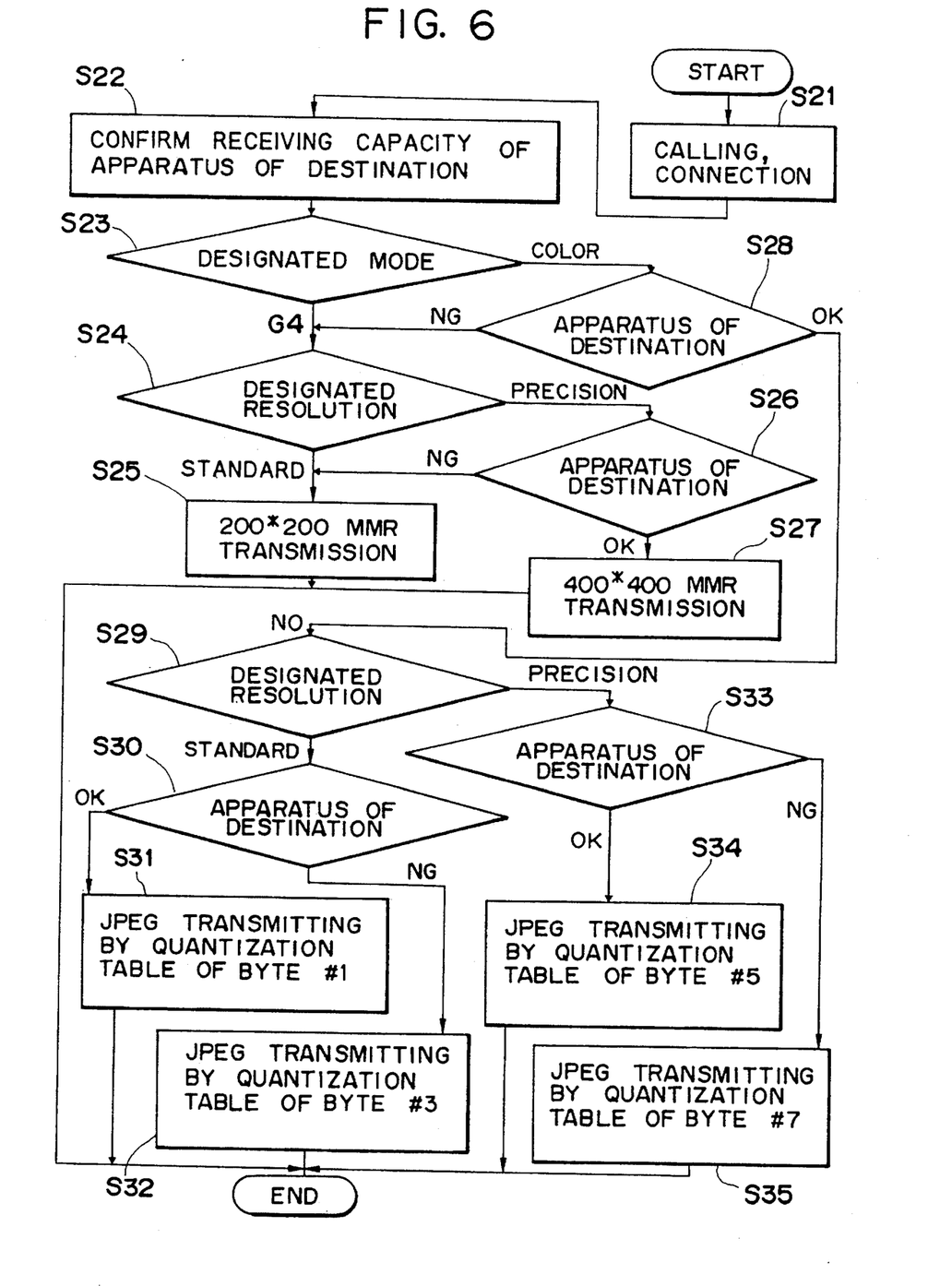
FIG. 6 is a flowchart of the operation of image transmission.

Referring now to a flowchart of FIG. 6, the operation from the calling to the determination of encoding method, resolution and quantization table in the apparatus of this embodiment will be described below.

Calling is made in accordance with the dial input, and the line is connected (S21). First, the paper size, resolution and encoding method within the ability of the receiver are confirmed (S22). This is included in, for example, a response RDCLP (Response Document Capability List Positive) in the document layer for the G4 facsimile protocol, but is not limitative to such G4 facsimile protocol, and may be other protocols.

Herein, if G4 is selected by G4/color selection key 40 (S23), and the standard resolution is selected by resolution selection key 42 (S24), the flow transfers to S25, where an original is read at 200 dpi×200 dpi and encoded by MMR encoding circuit 20 (S25) for the transmission. Or image data obtained by reading the original is processed into data of 200 dpi×200 dpi.

On the other hand, if G4 is selected by G4/color selection key 40 (S23), and precision resolution is selected by resolution selection key 42 (S24), and unless the receiver has sufficient receiving capacity at the precision resolution (400 dpi×400 dpi) (S26), the flow transfers to S25, where an original is read at 200 dpi×200 dpi and encoded by MMR encoding circuit 20 for the transmission (S25), as previously described.

Also, if G4 is selected by G4/color selection key 40 (S23) and precision resolution is selected by resolution selection key 42 (S24), and the receiver has sufficient receiving capacity at the precision resolution (400 dpi×400 dpi) (S26), the flow transfers to S27, where an original is read at 400 dpi×400 dpi and encoded by MMR encoding circuit 20 for the transmission (S27).

On the other hand, if color is selected by G4/color selection key 40 (S23), and unless the apparatus of destination has sufficient color receiving capacity (S28), the flow transfers to S24, where G4 transmission is designated, and an original is read at 200 dpi× 200 dpi or 400 dpi×400 dpi depending on the designated resolution (S24) and the receiving capacity of apparatus of destination (S26), and encoded by MMR encoding circuit 20 for the transmission (S25, S27), as previously described.

Also, if color is selected by G4/color selection key 40 (S23), and the apparatus of destination has sufficient color receiving capacity (S28), the flow transfers to S29, where the resolution designated by resolution selection key 42 is investigated. If it is a standard resolution (S29), a comparison is made between the resolution registered in byte #0 for the resolution selection key management table (FIG. 4) and the resolution of the apparatus of destination. Then, if the apparatus of destination has sufficient receiving capacity (S30), as original is read at a resolution (400 dpi×400 dpi) registered in byte #0 for the resolution selection key management table, and image data obtained by reading the original is encoded by color encoding circuit 22, in accordance with the JPEG method, using a quantization table with relatively high compression ratio registered in byte #1, and then transmitted.

At S30, if the apparatus of destination is determined to have insufficient receiving capacity with respect to a resolution read from the resolution selection key table in accordance with the designation of standard resolution, and registered in byte #0 (S29, S30), an original is read at the resolution (200 dpi× 200 dpi) registered in byte #2 for the resolution selection key management table, and encoded by color encoding circuit 22 using a quantization table registered in byte #3 for the transmission (S32).

Also, if precision resolution is selected by resolution selection key 42 (S29), a compariosn is made between the resolution (400 dpi×400 dpi in FIG. 4) registered in byte #4 for the resolution selection key management table (FIG. 4) and the resolution of the apparatus of destination. Then, if the apparatus of destination has sufficient receiving capacity (S33), an original is read at a resolution registered in byte #4 for the resolution selection key management table, and encoded by color encoding circuit 22, in accordance with the JPEG method, using a quantization table registered in byte #5 and capable of reproducing image with relatively high image quality for the transmission (S34).

Also, if the apparatus of destination has insufficient receiving capacity with the resolution registered in byte #4 and read in accordance with the designation of precision resolution (S29, S33), an original is read at a resolution (200 dpi×200 dpi) registered in byte #6 for the resolution selection key management table, and encoded by color encoding circuit 22, using a quantization table registered in byte #7 for the transmission (S35).

The embodiment having the MMR method and the JPEG method for the encoding has been described, but it will be appreciated that this embodiment may be applicable to image transmission apparatus utilizing other encoding methods.

Figure 7:
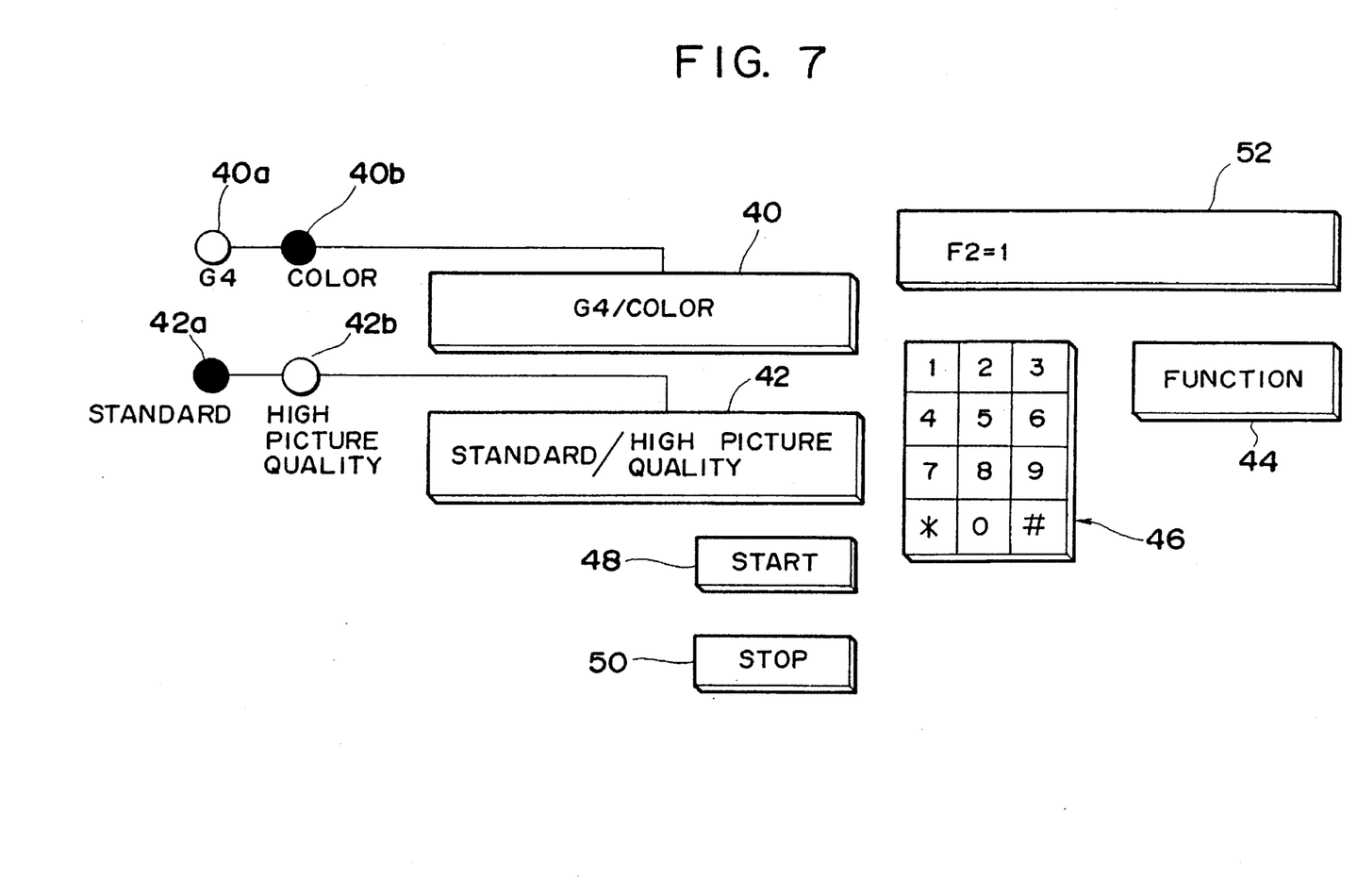
FIG. 7 is a view illustrating an operation panel face of an operation unit 26 in another embodiment.

As above described, this embodiment makes it possible to change not only the resolution but also the quantization table for use with the JPEG method in color encoding by operating a switch 42 as shown in FIG. 2. Also, it is possible to change only the quantization table in color encoding, without changing the resolution. For this purpose, the switch 42 in the operation unit as shown in FIG. 2 may be displayed as "standard/high picture quality" as shown in FIG. 7.

As will be easily understood from the above description, according to this embodiment, the image quality can be adjusted by the selection of quantization table with the resolution fixed. Since the quantization table can be selected substantially freely though the resolution can be only selected discretely, the selection range for the image can be extended.

Also, since resolution selecting means is assignable with the resolution as well as the quantization table used, image information can be transmitted at a desired image quality with either of two encoding methods selected. The key operation in image transmission is simplified to provide improved operativity.

According to this embodiment, it is possible to make encoding at a desired image quality under a plurality of encoding conditions such as, for example, resolution and quantization table, with simple selecting operation by designating means.

Also, because the compatibility with the receiving capacity of the receiver is determined in predetermined priority, and the encoding is made under the encoding condition in higher priority as matched, image information can be encoded at as high an image quality as possible, resulting in the operation for image transmission being greatly simplified.

What is claimed is:

1. An image processing apparatus comprising:

encoding means having a first encoding method including a converting process for converting image information into frequency space and a quantization process for quantizing the converted image information, said quantization process capable of changing a quantization characteristic in encoding image information, and a second encoding method having an encoding characteristic different from that of said first encoding method;

encoding selection means for selecting either said first encoding method or second encoding method; and setting means for setting the quantization characteristic in said first encoding method.

2. An image processing apparatus according to claim 1, wherein a resolution is selected by said setting means when said second encoding method is selected by said encoding selection means.

3. An image processing apparatus according to claim 1, wherein said second encoding method is an MMR method.

4. An image processing apparatus according to claim 1, wherein said setting means manually sets the quantization characteristic.

5. An image processing apparatus comprising:

encoding means having a first encoding method including a quantization process capable of changing the quantization characteristic in encoding image information, and a second encoding method having an encoding characteristic different from that of said first encoding method;

encoding selection means for selecting either said first encoding method or second encoding method; and setting means for setting the quantization characteristic in said first encoding method, wherein said first encoding method is a JPEG method.

6. An image processing apparatus according to claim 5, wherein said second encoding method is an MMR method.

7. An image processing apparatus according to claim 5, wherein a resolution is selected by said setting means when said second encoding method is selected by said encoding selection means.

8. An image processing apparatus according to claim 5, wherein said setting means manually sets the quantization characteristic.

9. An image communication apparatus comprising:

encoding means having a first encoding method including a quantization process capable of changing the quantization characteristic, corresponding to the encoding of image information, and a second encoding method having an encoding characteristic different from that of said first encoding method;

encoding selection means for selecting either said first encoding method or second encoding method;

selection means for selecting the quality of image information to be transmitted; and memory means for storing the resolution and the quantization characteristic used in the quantization process of said first encoding method for each selection of said selection means, wherein said first encoding method is a JPEG method.

10. An image communication apparatus according to claim 9, wherein at least part of information stored in said memory means can be changed.

11. An image communication apparatus according to claim 9, wherein said second encoding method is an MMR method.

12. An image communication apparatus comprising:

encoding means having a first encoding method including a converting process for converting image information into frequency space and a quantization process for quantizing the converted image information, said quantization process capable of changing a quantization characteristic corresponding to the encoding of image information, and a second encoding method having an encoding characteristic different from that of said first encoding method;

encoding selection means for selecting either said first encoding method or second encoding method;

selection means for selecting a quality of image information to be transmitted; and memory means for storing a resolution and the quantization characteristic used in the quantization process of said first encoding method for each selection of said selection means.

13. An image communication apparatus according to claim 12, wherein at least part of information stored in said memory means can be changed.

14. An image communication apparatus according to claim 12, wherein said second encoding method is an MMR method.

15. An image communication apparatus comprising:

encoding means having a first encoding method including a quantization process capable of changing the quantization characteristic, corresponding to the encoding of image information, and a second encoding method having an encoding characteristic different from that of said first encoding method;

encoding selection means for selecting either said first encoding method or second encoding method;

selection means for selecting the quality of image information to be transmitted; and memory means for storing the resolution and the quantization characteristic used in the quantization process of said first encoding method for each selection of said selection means, wherein said second encoding method is an MMR method.

16. An image transmission apparatus having encoding means corresponding to two or more encoding methods different in encoding characteristic, at least one encoding method being a quantization process capable of changing the quantization characteristic, comprising:

selection means for selecting the quality of image information to be transmitted; and memory means for storing the resolution and/or the quantization characteristic to be used with the quantization process capable of changing the quantization characteristic in said encoding method for each selection of said selection means, wherein said encoding method capable of changing said quantization characteristic is a JPEG method.

17. An image transmission apparatus according to claim 16, wherein said encoding method is an MMR method.

18. An image transmission apparatus according to claim 16, wherein at least part of information stored in said memory means can be changed.

19. An image transmission apparatus having encoding means corresponding to two or more encoding methods different in encoding characteristic, at least one encoding method including a converting process for converting image information into frequency space and a quantization process for quantizing the converted image information, said quantization process capable of changing a quantization characteristic, comprising:

selection means for selecting a quality of image information to be transmitted; and memory means for storing a resolution and/or the quantization characteristic to be used with the quantization process capable of changing the quantization characteristic in said one encoding method for each selection of said selection means.

20. An image transmission apparatus according to claim 19, wherein at least part of information stored in said memory means can be changed.

21. An image transmission apparatus according to claim 19, wherein said encoding method is an MMR method.

22. An image processing apparatus comprising:

image encoding means allowing for the selection of a plurality of encoding conditions, said image encoding means including converting means for converting image information into frequency space, and quantization means for quantizing image information converted into said frequency space;

memory means for storing a plurality of pieces of information regarding said plurality of encoding conditions; and designating means for designating a group of encoding conditions to be used with said encoding means, wherein said image encoding means encodes image information in accordance with a plurality of encoding conditions belonging to said group designated by said designating means.

23. An image processing apparatus according to claim 22, wherein said plurality of encoding conditions includes a resolution and a quantization table.

24. An image transmission apparatus comprising:

image encoding means allowing for the selection of a plurality of encoding conditions;

memory means for storing a plurality of pieces of information regarding said plurality of encoding conditions; and comparison means for making a comparison between the encoding condition stored in said memory means and the receiving capacity of a receiver according to a predetermined priority;

wherein said image encoding means encodes image information in accordance with a comparison result of said comparison means.

25. An image transmission apparatus according to claim 24, wherein said plurality of encoding conditions includes a resolution and a quantization table.

26. An image transmission apparatus according to claim 24, wherein said image encoding means includes converting means for converting image information into frequency space, and quantization means for quantizing image information converted into said frequency space based on a quantization characteristic.

27. An image processing apparatus comprising:

encoding means having a first encoding method including a converting process for converting image information into frequency space and a quantization process for quantizing the converted image information, said quantization process capable of changing a quantization characteristic in encoding image information, and a second encoding method having an encoding characteristic different from that of said first encoding method;

encoding selection means for selecting either said first encoding method or second encoding method; and setting means for setting the quantization characteristic in said first encoding method by selecting one of a plurality of quantization tables.

28. An image processing apparatus according to claim 27, wherein said first encoding method is a JPEG method.

29. An image processing apparatus according to claim 27, wherein said second encoding method is an MMR method.

30. An image processing apparatus comprising:

encoding means having a first encoding method including a converting process for converting image information into frequency space and a quantization process for quantizing the converted image information, said quantization process capable of changing a quantization characteristic in encoding image information, and a second encoding method having an encoding characteristic different from that of said first encoding method;

encoding selection means for selecting either said first encoding method or second encoding method; and setting means for setting the quantization characteristic in said first encoding method by linking a condition of said second encoding method.

31. An image processing apparatus according to claim 30, wherein said first encoding method is a JPEG method.

32. An image processing apparatus according to claim 30, wherein said second encoding method is an MMR method.

* * * * *

UNITED STATES PATENT AND TRADEMARK OFFICE
CERTIFICATE OF CORRECTION

PATENT NO. : 5,488,483
DATED : January 30, 1996
INVENTOR(S) : MASAHIRO MURAYAMA

It is certified that error appears in the above-identified patent and that said Letters Patent is hereby corrected as shown below:

On title page,

AT [56] REFERENCES CITED

Other Publications,
    "Compression.""State-" should read
    --Compression." ¶ "State--.

Attorney, Agent, or Firm,
    "Fitzpatrick, Cella Harper & Scinto" should read
    --Fitzpatrick, Cella, Harper & Scinto--.

AT [57] ABSTRACT

Line 3, "dp)" should read --dpi)--.

COLUMN 1

Line 30, "compressed" should read --being compressed--.
    Line 40, "compressed" should read --being compressed--.

UNITED STATES PATENT AND TRADEMARK OFFICE
CERTIFICATE OF CORRECTION

PATENT NO.  : 5,488,483
DATED       : January 30, 1996
INVENTOR(S) : MASAHIRO MURAYAMA It is certified that error appears in the above-identified patent and that said Letters Patent is hereby corrected as shown below:

COLUMN 3

Line 67, "FIG. 4" should read --FIG. 3--.

Signed and Sealed this

Thirteenth Day of August, 1996

Attest:

BRUCE LEHMAN

Attesting Officer     Commissioner of Patents and Trademarks